US006138341A

United States Patent [19]

Barroero et al.

[11] Patent Number: 6,138,341

[45] Date of Patent: Oct. 31, 2000

[54] REFRIGERATOR DOOR ASSEMBLY METHOD

[75] Inventors: Louis Barroero, San Leandro; John P. Rivers, Livermore, both of Calif.

[73] Assignee: Frigidyne North America, Inc., Compton, Calif.

[21] Appl. No.: 08/970,913

[22] Filed: Nov. 14, 1997

Related U.S. Application Data

[60] Division of application No. 08/399,773, Mar. 7, 1995, Pat. No. 5,687,509, which is a continuation-in-part of application No. 08/294,193, Aug. 22, 1994, abandoned, which is a continuation of application No. 08/070,561, Jun. 1, 1993, abandoned, which is a division of application No. 07/826,883, Jan. 28, 1992, Pat. No. 5,228,240.

[51] Int. Cl.[7] .......... B23P 15/00

[52] U.S. Cl. .......... 29/527.1; 29/530

[58] Field of Search .......... 29/527.1, 530; 49/386; 264/328.1, 277, 275, 279

[56] References Cited

U.S. PATENT DOCUMENTS

| | | | |
|---|---|---|---|
| 1,807,948 | 6/1931 | Wolters | 264/277 |
| 2,181,464 | 11/1939 | Renner | 49/386 |
| 2,878,531 | 3/1959 | Benham | 49/386 |
| 2,987,782 | 6/1961 | Kurowski | 49/386 |
| 3,091,819 | 6/1963 | Wheeler et al. . | |
| 4,223,482 | 9/1980 | Barroero et al. | 49/386 |
| 4,637,167 | 1/1987 | Svensson | 49/386 |
| 4,753,043 | 6/1988 | Bockwinkel | 49/501 |
| 5,100,204 | 3/1992 | Makihara et al. | 29/527.1 X |

*Primary Examiner*—I Cuda
*Attorney, Agent, or Firm*—Finley & Berg, L.L.P.

[57] ABSTRACT

A refrigerator door assembly is mounted on a stationary frame of a refrigeration unit and comprises a door frame integrally molded about a thermo-pane in sealing relationship therewith. The door frame is hingedly mounted on the stationary frame of the refrigeration unit by a pair of upper and lower hinge pins. A torsion bar, integrally molded within the door frame and secured to one of the hinge pins, functions to constantly apply a closing force on the door frame to move the door assembly into sealing contact with the stationary frame of the refrigeration unit.

18 Claims, 7 Drawing Sheets

REFRIGERATOR DOOR ASSEMBLY METHOD

This application is a division of copending patent application Ser. No. 08/399,773, filed on Mar. 7, 1995, to be U.S. Pat. No. 5,687,509, issuing Nov. 18, 1997, which is a continuation-in-part of abandoned application Ser. No. 08/294,193, filed Aug. 22, 1994, which was a continuation of abandoned application Ser. No. 08/070,561, filed Jun. 1, 1993, which was a division of application Ser. No. 07/826,883 filed Jan. 28, 1992 now U.S. Pat. No. 5,228,240, issued Jul. 20, 1993.

TECHNICAL FIELD

This invention relates generally to a refrigeration unit and more particularly to a unitized refrigerator door assembly therefor.

BACKGROUND OF THE INVENTION

Conventional window-type door assemblies for refrigeration units of the type used in supermarkets and the like comprise a frame having a thermo-pane mounted therein. The frame is composed of extruded aluminum frame members secured together by corner brackets. The thermo-pane normally comprises a pair of glass plates suitably spaced apart by spacer members disposed about the peripheries of the plates. An elastomeric gasket is secured between the frame and the edges of the plates in a conventional manner.

Standard door assemblies of this type are expensive to fabricate and assemble due to the large number of component parts involved and the labor intensive steps required for the assembly process. Further, a relatively high thermal conductivity is exhibited by the aluminum frame that induces undue conduction of heat within the refrigeration unit. In addition, an electrical heating system is normally required to prevent condensation on the glass plates composing the thermo-pane. The door assemblies also normally require the consumer-customer to close them manually, after they have been opened for product procuring purposes.

SUMMARY OF THE INVENTION

An object of this invention is to overcome the above, briefly described problems encountered with conventional door assemblies for refrigeration units by providing an economical refrigerator door assembly that exhibits a high degree of structural integrity and efficiency when placed in operation.

In one aspect of this invention, the refrigerator door assembly comprises a door frame and vertically aligned upper and lower hinge pins integrally molded within the door frame for mounting the door assembly for pivotal movement about a common pivot axis on a stationary frame of a refrigeration unit.

In another aspect of this invention, a torsion bar is molded as an integral part of the door frame and functions to constantly apply a closing force on the door assembly.

In still another aspect of this invention, a symmetrical assembly comprising hinge pin sockets and a sheath which allows a torsion bar to rotate in it are incorporated in the door and allows the door to be assembled for either right or left swing at the installation site.

In still another aspect of this invention, a method for making the refrigerator door assembly is taught which includes injecting a liquified thermo plastic or thermosetting plastic material into a mold cavity to form the door frame and curing and hardening the plastic material to form a structurally integrated refrigerator door assembly.

BRIEF DESCRIPTION OF THE DRAWINGS

Other objects and advantages of this invention will become apparent from the following description and accompanying drawings wherein:

FIGS. 8(*a*)–(*d*) show four alternative hinge pin assembly embodiments;

DESCRIPTION OF THE PREFERRED EMBODIMENT

Figure 1:
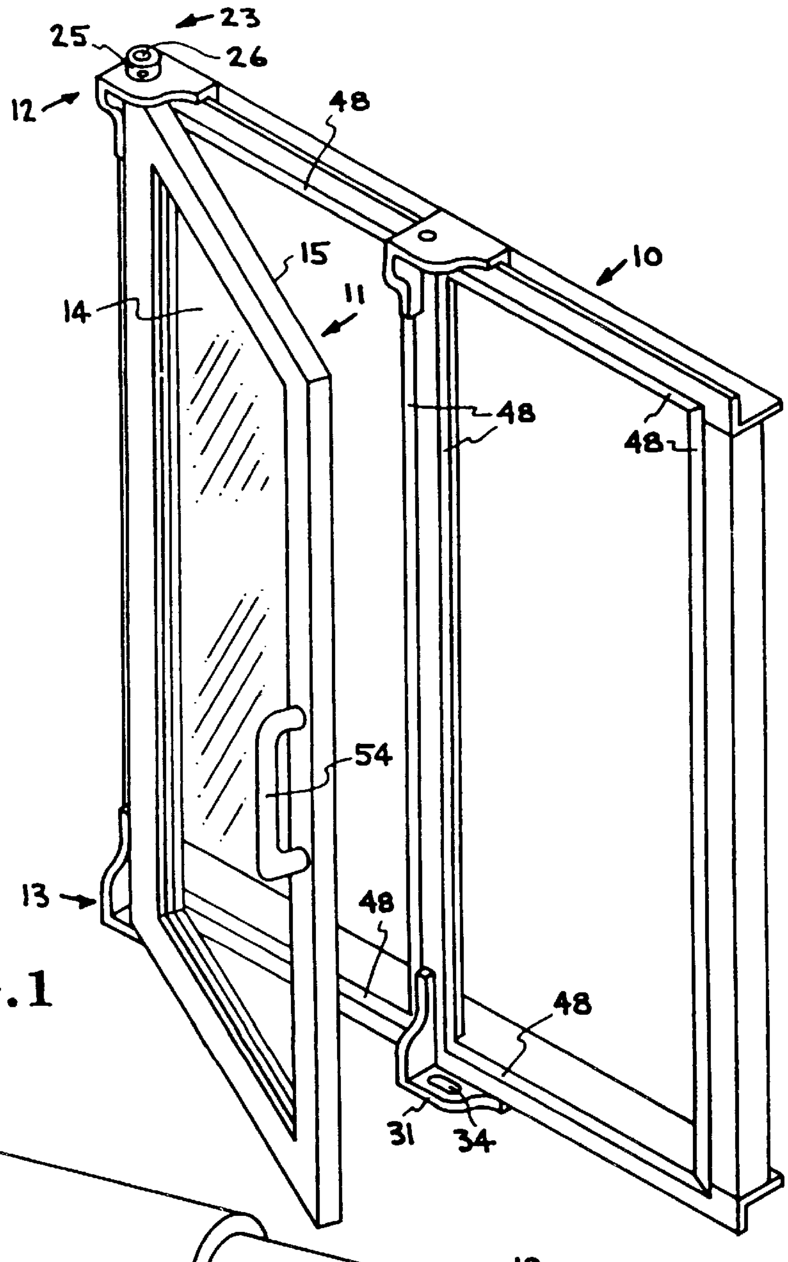
FIG. 1 is an isometric view illustrating a mounting frame for a refrigeration unit having a refrigerator door assembly of this invention hingedly mounted thereon.
Figure 2:
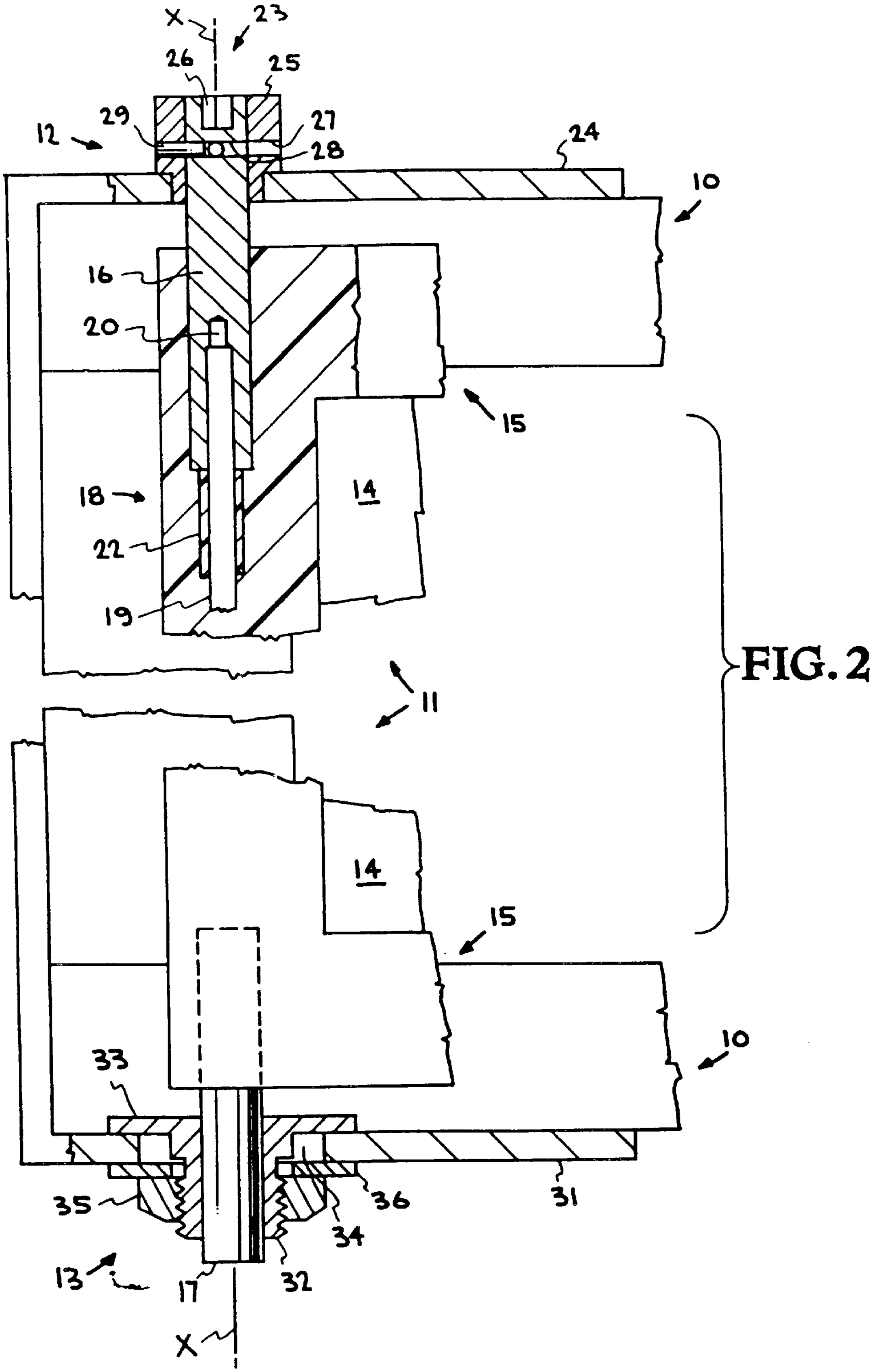
FIG. 2 is a partially sectioned, enlarged view illustrating upper and lower hinge assemblies mounting the refrigerator door assembly on the frame of the refrigeration unit.

FIG. 1 illustrates a stationary metallic mounting frame 10 of a refrigeration unit (not fully shown) of the commercial or domestic type. A refrigerator door assembly 11 is hingedly mounted on frame 10 by upper and lower hinge assemblies 12 and 13, respectively, for pivotal movement about a common pivot axis X (FIG. 2). As described more fully hereinafter, a second refrigerator door assembly is adapted to be hingedly mounted on the opposite side of frame 10 in a conventional manner. As will be obvious to those skilled in the refrigeration arts, the frame can be constructed in accordance with the teachings of this invention to mount one, two or more left and/or right handed (FIG. 1) door assemblies thereon, depending on the particular commercial or domestic application under consideration.

Each door assembly 11 comprises a transparent thermopane 14 having a door frame 15 integrally molded thereabout and in sealing relationship therewith, as described more fully hereinafter with reference to FIGS. 4 and 5. As shown in FIG. 2, upper and lower hinge assemblies 12 and 13 comprise vertically aligned upper and lower hinge pins 16 and 17, respectively. A torsion means 18 (FIG. 3) is connected to at least one of the upper and lower hinge pins for constantly applying a closing force F (FIG. 1) on door frame 15 to pivot the refrigerator door assembly towards its normal, closed position on mounting frame 10.

Figure 3:
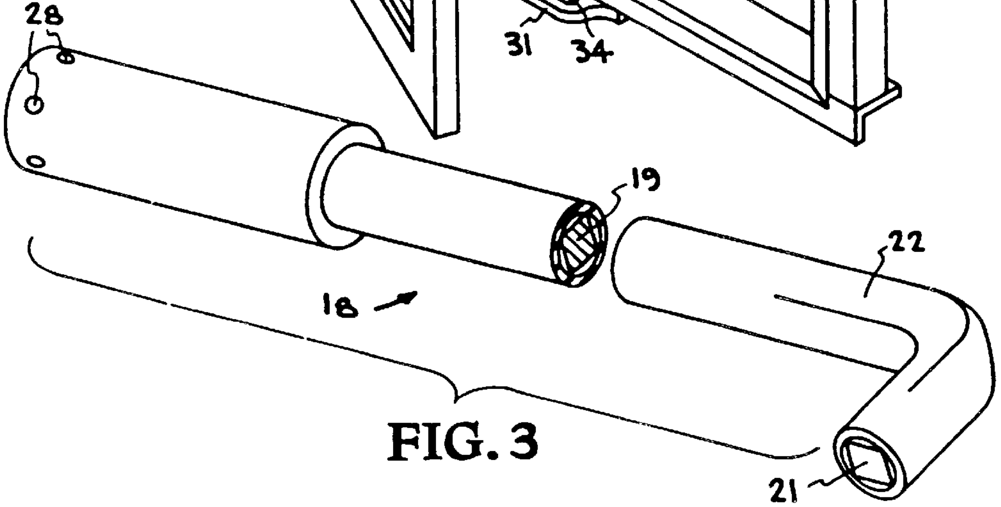
FIG. 3 is an isometric view illustrating a combined hinge pin and adjustable torsion bar that is molded and structurally integrated within a door frame of the refrigerator door assembly.
Figure 4:
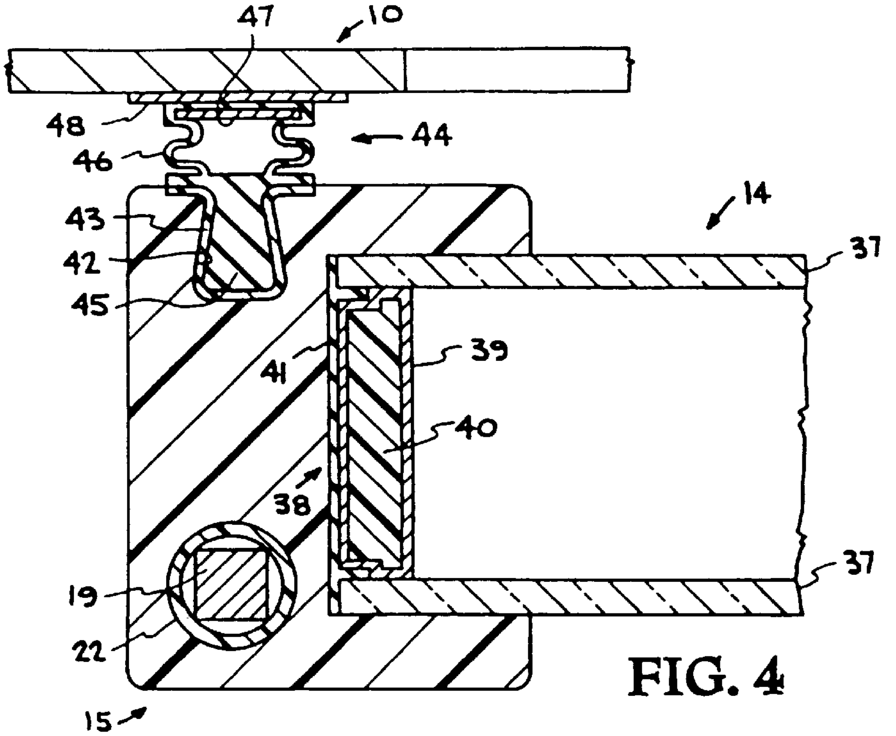
FIG. 4 is an enlarged sectional view partially illustrating the sealed disposition of a thermo-pane and torsion bar in the door frame and a static magnetic seal between the frame of the refrigeration unit and the door frame when the refrigerator door assembly is in its closed position.

As shown in FIGS. 2–4, the torsion means is molded within the door frame to be structurally integrated therewith and comprises a steel torsion bar 19. As shown in FIG. 2, the upper end of upper hinge pin 16 projects beyond an upper end of door frame 15 and an upper end of torsion bar 19 is secured to a lower end of pin 16. As shown in FIGS. 3 and 4, torsion bar 19 preferably has a square cross-section and an outer dimension slightly larger than a bore 20, preformed in pin 16 prior to the force-fitting or swaging of the torsion bar into the bore. In particular, the torsion bar is forced into the bore to plastically deform the contacting metal surfaces whereby the torsion bar and pin will be secured together for simultaneous rotation and twisting.

As shown in FIG. 2, a main body of torsion bar 19 is disposed on common pivot axis X of pins 16 and 17 and a lower end 21 of the torsion bar is bent to provide an anchoring leg 21 (FIG. 3) embedded in the door frame and disposed transversely relative to the axis. The dimensional parameters of the torsion bar, including its length and the location along the vertical height of door assembly 11 whereat anchoring leg 21 of the torsion bar is located (e.g., one-fourth of the length of the door assembly) as well as its composition, will be primarily dictated by the size and mass of the door assembly requiring a particular automatic closing force. As further shown in FIGS. 2 and 3, the torsion bar is preferably covered with a plastic sheath 22 to permit the torsion bar to twist within the sheath and relative to encapsulating door frame 15.

During the hereinafter described molding process, upper hinge pin 16 is preferably coated with a standard release agent to prevent the steel pin from adhering to the surrounding plastic material composing door frame 15. An adjustment means 23 is provided between upper hinge pin 16 and an upper hinge bracket 24, seamed to frame 10, of upper hinge assembly 12 for manually and selectively setting the magnitude of closing force F (FIG. 1) imposed on the door assembly. In the embodiment illustrated, adjustment means 23 comprises a collar 25 mounted on the upper end of hinge pin 16 and welded or otherwise suitably secured to upper hinge bracket 24.

A hexagonal socket 26 is formed in the proximal or upper end of pin 16 to adapt it for reception of a standard Allen head wrench whereby the pin can be rotated to selectively adjust the closing force imposed on the door assembly by torsion bar 19. A plurality of circumferentially spaced and radially extending bores 27 are formed in collar 25 for alignment with a plurality of like-formed bores 28, formed in the upper end of pin 16, for the reception of a locking pin 29 (FIG. 2). The bores and locking pin thus provide means for locking hinge pin 16 in a selected rotative position relative to collar 25 when the pin is rotated to impose the desired closing force on the door assembly.

As shown in FIG. 2, lower hinge assembly 13 comprises a lower hinge bracket 31 suitably secured on stationary mounting frame 10 to have the lower end of lower hinge pin 17 pivotally mounted thereon. The upper end of pin 17 is suitably secured within molded door frame 15. The pin is rotatably mounted within an externally threaded first nut 32 having an upper flange 33 overlying lower hinge bracket 31. The nut extends through an elongated slot 34, formed through bracket 31, and is secured in place by an internally threaded second nut 35 and a lock washer 36. Thus, means are provided for securing lower hinge pin 17 in an adjusted side-to-side position within slot 34 for vertically orientating common pivot axis X for vertically aligned pins 16 and 17, e.g., to adjust for "door sag."

As shown in FIG. 4, thermo-pane 14 comprises a pair of spaced-apart window panes or glass plates 37, preferably tempered and pre-treated in a conventional manner for refrigerator door applications. A sealing strip 38 is disposed between and about the periphery of the glass plates and is integrally molded within door frame 15. The sealing strip comprises a metallic spacer 39 that encapsulates a silica gel material 40 and an elastomeric (natural or synthetic rubber) gasket 41 covering the outer edges of the sealing strip and glass plates. The space between glass plates 37 can be evacuated or filled with an inert thermal insulating gas, as is well-known to those skilled in the art.

A groove 42 is formed in an inner side of door frame 15 to extend about the frame and has an elastomeric gasket 43 preformed therein. A magnetic strip and seal means 44 is press-fit and secured in groove 42 for maintaining the refrigerator door assembly in closed and sealed relationship on stationary mounting frame 10. The magnetic strip and seal means comprises an elastomeric member, including a generally U-shaped anchoring stem 45 compressed within groove 42 and a bellows-type elastomeric gasket 46 having a magnetic strip 47 secured therein. A metallic tape 48 in strip-form is suitably secured on the outer face of mounting frame 10 (FIGS. 1 and 4) to cooperate with magnetic strip 47 to hold the refrigerator door assembly in sealing relationship on the frame when the door assembly is moved automatically, by the force imposed thereon by torsion rod 19, to its normally closed position on frame 10.

Figure 5:
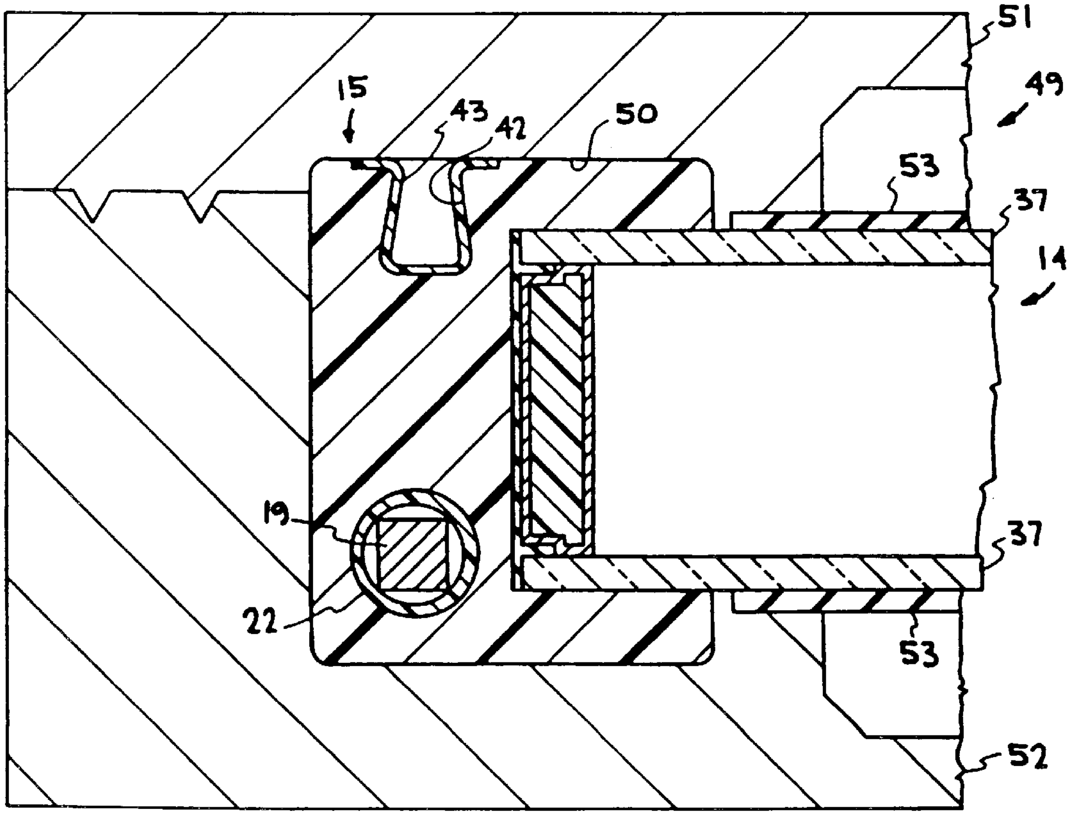
FIG. 5 is a sectional view partially illustrating a two-part mold assembly adapted to structurally integrate the thermo-pane, torsion bar and door frame during an injection molding process.
Figure 6:
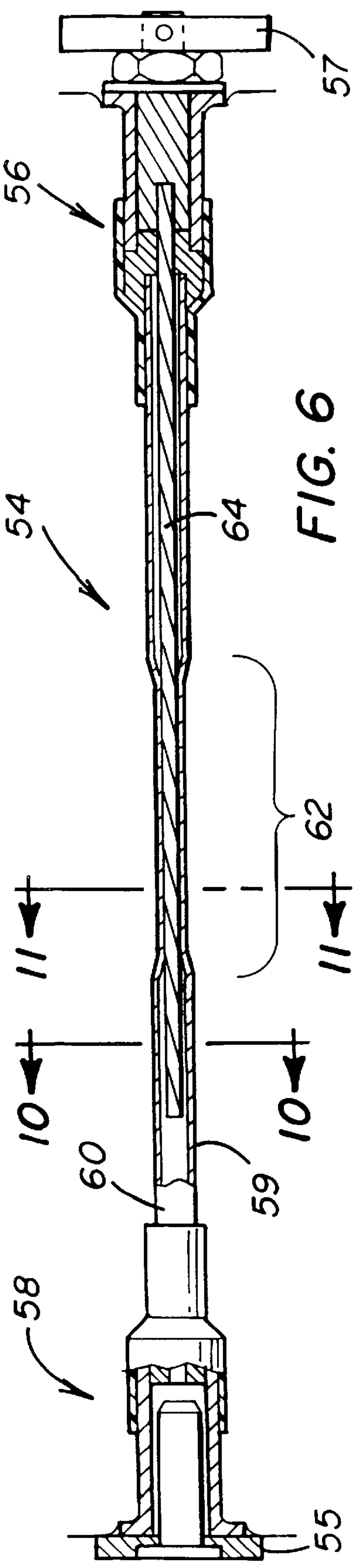
FIG. 6 is a sectional view illustrating a symmetrical hinge pin closing mechanism including a torsion bar hinge pin and a plain hinge pin.

FIG. 5 partially illustrates a two-part mold assembly 49 utilized for carrying forth the method steps for making structurally integrated refrigerator door assembly 11. The method comprises positioning thermo-pane 14, having sealing strip 38 suitably secured between glass plates 37, within a mold cavity 50, along with hinge pins 16 and 17, torsion bar 19 and covering sheath 22, and elastomeric gasket 43. Elastomeric (rubber) sheets 53 are preferably disposed between glass plates 37 and the mold parts for glass protection purposes. A liquified thermoplastic or thermo-setting plastic material of a suitable type is then injected into mold cavity 50 in a conventional manner to form door frame 15 in sealing relationship about thermo-pane 14 and to structurally integrate the thermo-pane, hinge pins and torsion bar within the frame. As suggested above, a suitable release agent is coated onto hinge pin 16 prior to the molding process to insure that the pin is allowed to twist within the door frame after it has been allowed to cure and harden.

After the completed refrigerator door subassembly has been completed, magnetic strip and seal assembly 44 is suitably secured within groove 42 about the periphery of the door frame and hinge pins 16 and 17 are mounted in upper and lower hinge brackets 24 and 31, respectively. During installation, lower hinge pin 17 can be adjusted by the selective loosening and tightening of nut 35 (FIG. 2) to ensure vertical orientation of hinge pins 16 and 17. Further, an Allen wrench is applied to socket 26, prior to installation of locking pin 29, to set the desired torsional force on torsion bar 19 in the manner described above.

The plastic material composing molded door frame 15 may be of any suitable type. For example, the plastic material composing the door frame may comprise ABS (three-monomer system composed of acrylonitrile, butadiene and styrene), OSA (olefin-modified styrene-acrylonitrile) acetal copolymer, glass-reinforced high impact acrylic, or other suitable plastic resin material adapted for refrigerator door applications of the type described herein. Although refrigerator door assembly 11 is described as having a thermo-pane 14, it should be understood that it could be formed solid for certain refrigeration applications. Suitable screw-type inserts (not shown) could also be integrally formed within the door frame for subsequent attachment of a standard handle 54 thereon (FIG. 1). The door frame can be permanently colored by adding a standard coloring pigment to the liquified plastic material during the molding process.

FIGS. 6 through 12 illustrate alternative embodiments of this invention. In general, the alternative embodiments substitute, in place of the upper and lower hinge assemblies 12 and 13 shown in FIG. 2 and the torsion means 18 shown in FIG. 3, a symmetrical hinge pin closing mechanism 54 shown in FIG. 6. The symmetrical design of the hinge pin closing mechanism 54 permits the refrigerator door to be assembled at the installation site so that the torsion bar hinge pin assembly is located at the bottom of the door whether the door is a right swing or left swing door. By turning the door top to bottom and installing the torsion bar hinge pin 56 on the bottom and the plain hinge pin 58 at the top, the same door can be installed as either a right or left swing door. Thus, a single mold can produce a refrigerator door that can be installed as a left or right swing door where the torsion bar hinge assembly is located at the lower end of the hinge pin closing mechanism.

The hinge pin closing mechanism 54 of the alternative embodiment comprises a sheath 59, a torsion bar 64, a torsion bar hinge pin assembly 58, a plain hinge pin assembly 56, and upper 55 and lower 57 hinge brackets.

Figure 7:
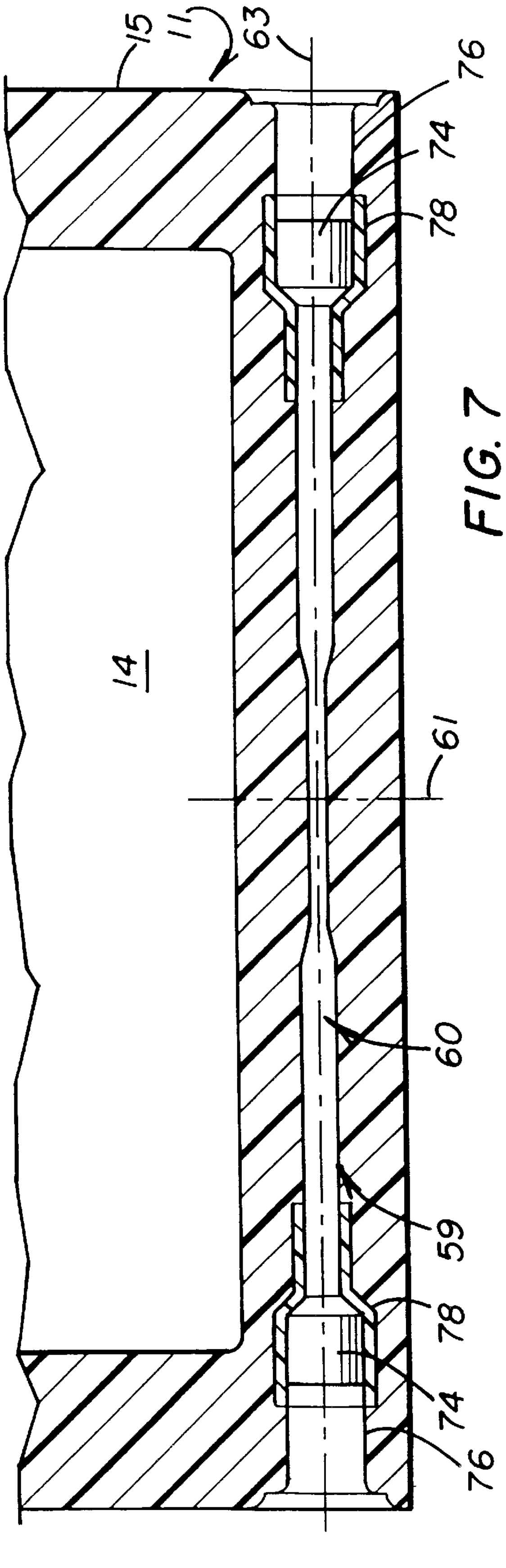
FIG. 7 is a sectional view illustrating the portion of the symmetrical hinge pin closing mechanism incorporated in the molded refrigerator door assembly.
Figure 8:
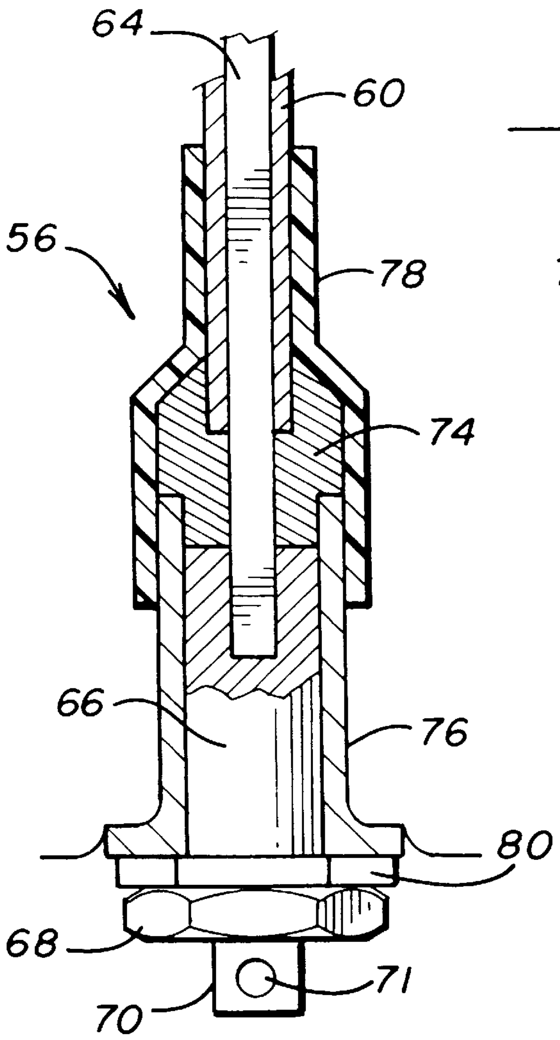
FIG. 8 is a sectional view partially illustrating the torsion bar hinge assembly of the symmetrical hinge pin closing mechanism.
Figure 9:
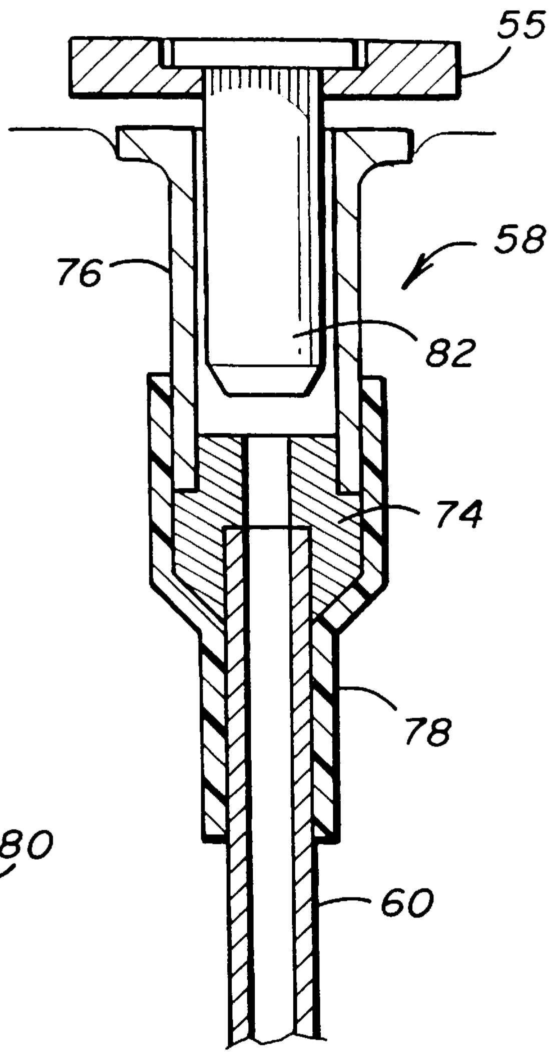
FIG. 9 is a sectional view partially illustrating the plain hinge assembly and hinge pin plate of the symmetrical hinge pin closing mechanism.

As shown in FIGS. 7–9, the sheath 59 is symmetrical along line 61 and along line 63. This symmetrical design allows the same door to be installed as a left or right swing door at the installation site. The sheath is comprised of an elongated portion 60, two transition portions 74, and two hinge socket portions 76. The elongated portion is disposed in a vertical orientation along the pivot axis X of the refrigerator door. The transition portions 74 and hinge sockets 76 are shown more clearly in FIGS. 8 and 9.

In a preferred embodiment, the elongated portion 60, two transition portions 74, and two hinge sockets 76 are of five separate pieces assembled as shown in FIGS. 8 and 9. Shrink-fit tubing 78 is slipped over a portion of the assembly and heated to shrink into a form-fitting seal. The shrink-fit tubing 78 keeps the thermoplastic or thermo-setting plastic material out of the sheath during the molding process. The shrink fit tubing 78 also holds the separate parts of the sheath together before they are molded into the door frame as described below.

The elongated portion 59 of the sheath 60 is mechanically distorted in a center section 62.

The sheath is embedded in the door frame 15 when the liquified thermoplastic or thermo-setting plastic material is injected into the mold cavity 50 as described above.

Figure 10:
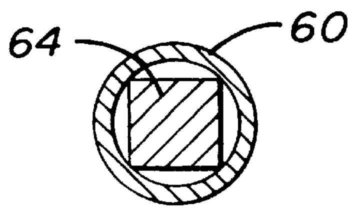
FIG. 10 is a vertical sectional view illustrating the torsion bar and the sheath of the symmetrical hinge pin closing mechanism.
Figure 11:
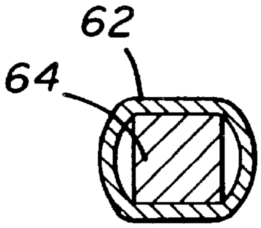
FIG. 11 is a sectional view illustrating the torsion bar and the sheath of the symmetrical hinge pin closing mechanism at the flattened mid-section of the sheath.

As shown in FIGS. 8, 10 and 11, the torsion bar 64 is square in section. As shown in greater detail in FIG. 8, one end of the torsion bar 64 is secured to the torsion bar hinge pin 66 by force fit, solder or other suitable means. The torsion bar 64 is of a suitable length to be anchored in the flattened section 62 of the sheath 60 when the torsion bar hinge pin 66 and torsion bar 64 are inserted into the hinge socket 76.

In a preferred embodiment, the torsion bar hinge pin 66 comprises an adjustment nut 68, a locking stud 70 and pin 72, and a nylon washer 80. The torsion bar hinge pin 66, the adjustment nut 68, and the locking stud 70 may be made in one piece. The adjustment nut 68 is of a shape which can be turned by a wrench to adjust the torque necessary to close the refrigerator door 11. Locking stud 70 is drilled through at 71 to accept a dowel pin which will lock in the torque necessary to close the door. A nylon washer or washer made of other suitable material 80 rests on the side of the adjustment nut closest to the refrigerator door in order to keep the adjustment nut 68 from rubbing on the hinge socket 76.

The plain hinge pin 82 of a preferred embodiment is shown in more detail in FIG. 9. The plain hinge pin 82 is a simple rod shape with an end of the pin slightly larger in diameter so that the pin can anchor in the plain hinge block 55 as shown in FIG. 9.

Alternatively, the torsion bar hinge pin assembly and plain hinge pin assembly can be of any shape necessary to fit existing hinge brackets on a refrigeration unit. Examples of possible shapes of hinge pin assemblies are shown in FIGS. 8*a*–8*d*.

Figure 8B:
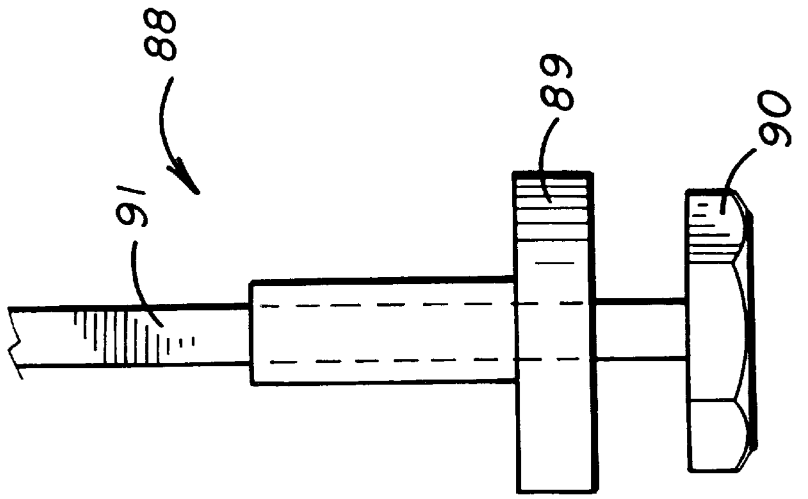
Figure 8A:
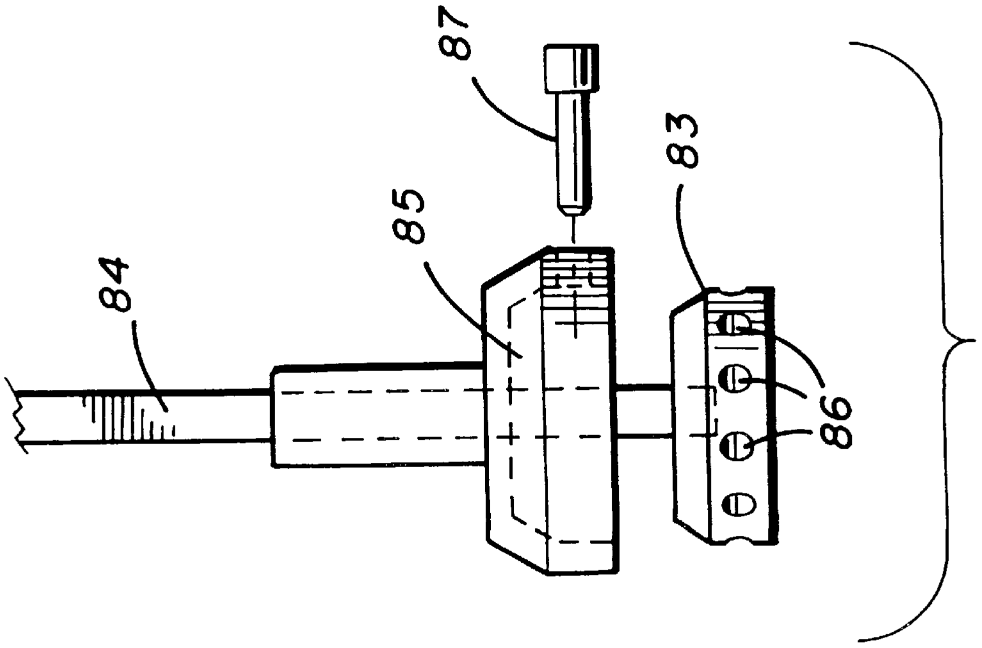

In FIG. 8*a*, the torsion bar hinge pin includes a locking stud 83 which is attached to the torsion bar 84. Fitted around the torsion bar 84 and resting on the locking stud 83 is a spacer sleeve 85. A plurality of holes 86 are drilled in the locking stud 83. The locking stud 83 can then be rotated in the existing hinge bracket on the refrigeration unit, and a locking pin 87 can be inserted in one of the holes 86 to lock in a desired torque.

In FIG. 8*b*, the torsion bar hinge pin 88 with bar 91 also includes a spacer sleeve 89. The torsion bar hinge pin 90 is hexagonal in section to fit in an existing hinge bracket. Bar 91 is pressed into pin 90. The torque is adjusted by a conventional means present in the existing hinge bracket.

Figure 8C:
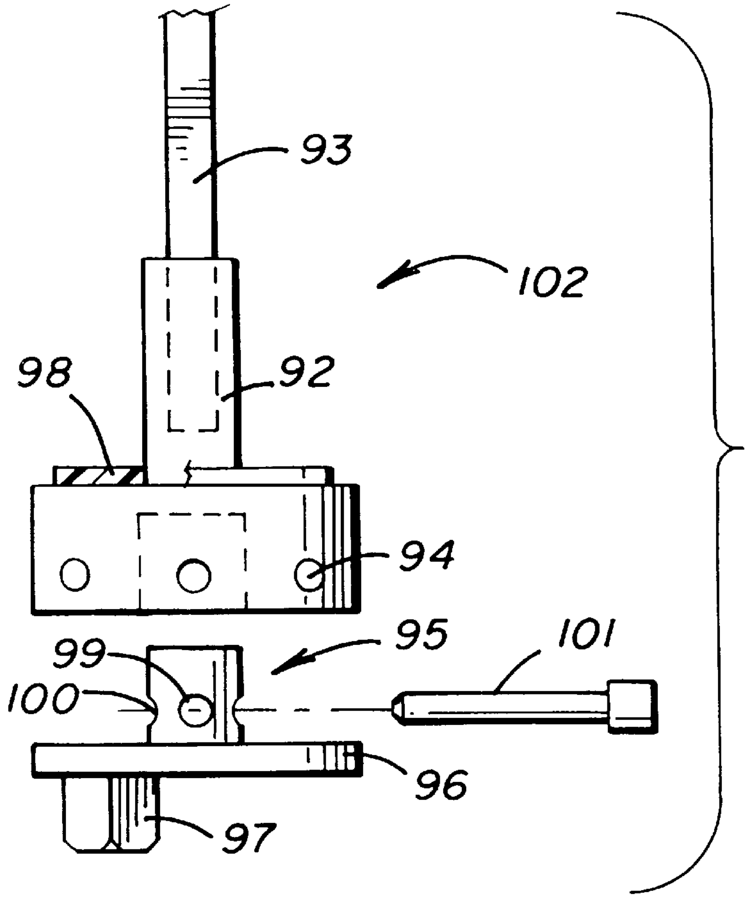
Figure 8D:
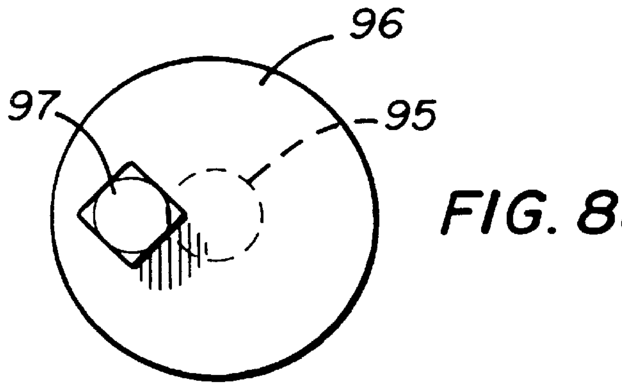

In FIGS. 8*c* and 8*d*, the torsion bar hinge pin 102 of yet another embodiment includes a spacer portion 92. However, in this embodiment, the spacer portion 92 is attached to the torsion bar 93 and a plurality of holes 94 drilled therethrough around its circumference in order to provide a locking means. The rod 95 of the torsion bar hinge pin 102 includes a disk 96 with a protrusion 97 square in section. This protrusion 97 can be offset as shown in the figure in order to provide for a correct pivot axis for the refrigerator door. A nylon washer 98 rests on the spacer portion. The rod 95 of the torsion bar hinge pin 102 is also drilled through in two places 99 and 100. When the torsion bar hinge pin 102 is assembled, a pin 101 can be inserted through the holes 94 in the spacer portion 92 and the holes 99 in the rod 95 to lock in the desired torque.

At the installation site, the plain hinge pin 82 is anchored into plain hinge block 55 which is attached to the refrigerator by screws or other suitable means known in the art. The torsion hinge pin 66 and attached torsion bar 64 are inserted into one of the hinge sockets 76 incorporated into the refrigerator door frame 15. A portion of the torsion bar's length is anchored in the mid-section 62 of the sheath 60 by a mechanical distortion of the sheath 60 as illustrated in FIG. 11. FIG. 10 shows the torsion bar 64 in the undistorted sections of the sheath 60. The refrigerator door 11 as assembled is placed on the refrigerator so that the plain hinge pin 82 is inserted into the hinge socket 76 which does not contain the torsion bar hinge pin 66. In this way, the refrigerator door 11 is hingedly mounted on the mounting frame 10 of a refrigeration unit.

Figure 12:
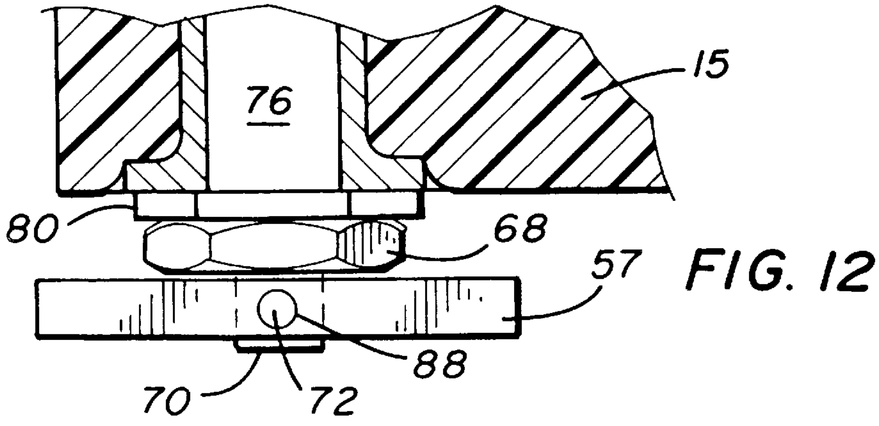
FIG. 12 is a sectional view partially illustrating the torsion bar hinge assembly of the symmetrical hinge pin closing mechanism incorporated in the molded refrigerator door assembly and installed in a refrigerator unit.

As shown in FIG. 12, the locking stud 70 is inserted into the torsion hinge block 57, which is attached by screws or other suitable means known in the art to the mounting frame 10 of a refrigeration unit. The adjustment nut 68 can then be turned with a wrench to adjust the torque needed to close the refrigerator door. When the appropriate torque is obtained, hole 72 in the locking stud 70 can be lined up with hole 88 in the hinge block 57 and a pin 72 can be inserted to lock in the torque.

What is claimed is:

1. A method for making a refrigerator door assembly adapted to be hingedly mounted on a stationary frame of a refrigeration unit comprising:

securing a torsion bar to at least one of an upper and a lower hinge pin;

aligning said upper and lower hinge pins vertically and placing them into a mold cavity;

injecting a liquified thermoplastic or thermo-setting plastic material into said mold cavity to form a door frame such that said torsion bar is encapsulated within the plastic material composing said door frame and such that at least a portion of said torsion bar is capable of movement relative to said door frame; and curing and hardening said plastic material to form a structurally integrated refrigerator door assembly.

2. The method of claim 1 further comprising positioning a pair of spaced-apart window panes in said mold cavity and further positioning a static thermal sealing strip between overlying peripheral edges of said window panes prior to said injecting step.

3. A method for making a refrigerator door assembly adapted to be hingedly mounted on a stationary frame of a refrigeration unit comprising:

placing vertically aligned upper and lower hinge pins in a mold cavity defining the shape of a door frame so that said pins project beyond said door frame, securing a torsion bar to at least one of said upper and lower hinge pins, positioning the peripheries of a pair of spaced-apart window panes, having a static thermal sealing strip therearound, in said mold cavity, injecting a liquid plastic material into said mold cavity to form a door frame about the peripheries of said window panes and to encapsulate said torsion bar such that at least a portion of said torsion bar is capable of movement relative to said door frame, and curing and hardening said plastic material to form a structurally integrated refrigerator door assembly about said window panes.

4. The method of claim 3 further comprising placing an elastomeric sheet between said window panes and mold parts, defining said mold cavity, to protect said window panes.

5. The method of claim 3 further comprising coating the hinge pin, having said torsion bar secured thereto, with a release agent prior to said injecting step to insure that the hinge pin is allowed to twist within the door frame after it has been allowed to cure and harden.

6. The method of claim 5 further comprising aligning a main body of said torsion bar with said aligned upper and lower pins.

7. The method of claim 6 further comprising anchoring a first end of said torsion bar in said door frame.

8. The method of claim 7 wherein said anchoring step comprises bending said first end of said torsion bar prior to said injecting step and wherein said step of securing a torsion bar to at least one of said upper and lower hinge pins comprises securing a second end of said torsion bar to one of said upper or said lower hinge pins.

9. The method of claim 3 further comprising covering said torsion bar with a sheath, prior to said injecting step, to permit said torsion bar to twist relative to said door frame after it has been allowed to cure and harden.

10. The method of claim 5 further comprising pivotally mounting said upper and lower hinge pins on respective upper and lower mounting brackets secured to a stationary frame.

11. The method of claim 10 further comprising adjusting said lower hinge pin to insure vertical orientation of said upper and lower hinge pins.

12. The method of claim 11 wherein said securing step comprises securing an upper end of said torsion bar to said upper hinge pin and further comprising setting a desired torsional force on said upper hinge pin and on said torsion bar to set the magnitude of closing force imposed on said door assembly by said torsion bar.

13. The method of claim 12 wherein said setting step comprises rotating said upper hinge pin and locking said upper hinge pin to said upper mounting bracket.

14. A method for making a refrigerator door assembly adapted to be hingedly mounted on a stationary frame of a refrigeration unit comprising placing an elongated sheath in a mold cavity defining the shape of a door frame so that the sheath is disposed along the pivot axis of the door when mounted and the two open ends of said sheath are flush with the outer edge of the door frame, positioning the peripheries of a pair of spaced-apart window panes, having a static thermal sealing strip therearound, in said mold cavity, injecting a liquid plastic material into said mold cavity to form a door frame about the peripheries of said window panes and to encapsulate said elongated sheath, and curing and hardening said plastic material to form a structurally integrated refrigerator door frame about said window panes, inserting a plain hinge pin into a first open end of said elongated sheath so that said plain hinge pin projects beyond said door frame, securing a torsion bar to a torsion hinge pin inserting said torsion hinge pin and said torsion bar into a second open end of said elongated sheath so that the torsion bar is anchored to the elongated at some point along its length.

15. A method for manufacturing and mounting a refrigerator door assembly comprising the steps of claim 14 and further comprising pivotally mounting said plain and torsion hinge pins one each to upper and lower mounting brackets secured to a stationary frame.

16. The method of claim 15 further comprising setting a desired torsional force on said torsion hinge pin and on said torsion bar to set the magnitude of closing force imposed on said refrigerator door assembly by said torsion bar.

17. The method of claim 16 wherein said setting step comprises rotating said torsion hinge pin and locking said torsion hinge pin to the mounting bracket on which the torsion hinge pin is mounted.

18. The method of claim 2 further comprising the steps of bending a first end of said torsion bar prior to said injecting step and anchoring said first end of said torsion bar in said door frame, and wherein said step of securing a torsion bar to at least one of said upper and lower hinge pins comprises securing a second end of said torsion bar to one of said upper or said lower hinge pins.

* * * * *